United States Patent
Brown et al.

(10) Patent No.: US 8,516,488 B1
(45) Date of Patent: *Aug. 20, 2013

(54) ADJUSTING A RESOURCE ESTIMATE IN RESPONSE TO PROGRESS OF EXECUTION OF A REQUEST

(75) Inventors: Douglas P. Brown, Rancho Santa Fe, CA (US); Anita Richards, San Juan Capistrano, CA (US)

(73) Assignee: Teradata US, Inc., Dayton, OH (US)

( * ) Notice: Subject to any disclaimer, the term of this patent is extended or adjusted under 35 U.S.C. 154(b) by 230 days.

This patent is subject to a terminal disclaimer.

(21) Appl. No.: 12/942,466

(22) Filed: Nov. 9, 2010

(51) Int. Cl.
G06F 9/46 (2006.01)
G06F 7/00 (2006.01)

(52) U.S. Cl.
USPC ........... 718/104; 718/103; 707/718; 707/719; 707/720

(58) Field of Classification Search
None
See application file for complete search history.

(56) References Cited

U.S. PATENT DOCUMENTS

| | | | |
|---|---|---|---|
| 3,648,253 A | 3/1972 | Mullery | |
| 5,473,773 A | 12/1995 | Aman | |
| 5,504,894 A | 4/1996 | Ferguson | |
| 5,537,542 A | 7/1996 | Eilert | |
| 5,675,797 A | 10/1997 | Chung | |
| 6,052,694 A | 4/2000 | Bromberg | |
| 6,330,552 B1 * | 12/2001 | Farrar et al. | 705/400 |
| 6,339,552 B1 | 1/2002 | Taruishi | |
| 6,353,818 B1 | 3/2002 | Carino | |
| 6,718,358 B1 | 4/2004 | Bigus | |
| 6,950,848 B1 | 9/2005 | Yousefi'zadeh | |
| 7,124,146 B2 * | 10/2006 | Rjaibi et al. | 707/698 |
| 7,146,353 B2 | 12/2006 | Garg | |
| 7,228,546 B1 | 6/2007 | McCarthy | |
| 7,379,953 B2 * | 5/2008 | Luo et al. | 707/718 |
| 7,395,537 B1 | 7/2008 | Brown | |
| 7,657,501 B1 | 2/2010 | Brown | |
| 7,818,745 B2 * | 10/2010 | Snyder | 718/101 |
| 7,831,592 B2 * | 11/2010 | Markl et al. | 707/718 |
| 2002/0091746 A1 | 7/2002 | Umberger | |
| 2002/0095301 A1 | 7/2002 | Villena | |
| 2002/0143847 A1 | 10/2002 | Smith | |
| 2002/0194173 A1 | 12/2002 | Bjornson | |
| 2003/0002649 A1 | 1/2003 | Hettish | |
| 2003/0005028 A1 | 1/2003 | Dritschler | |
| 2003/0097443 A1 | 5/2003 | Gillett | |
| 2003/0174651 A1 | 9/2003 | Morton | |
| 2003/0233391 A1 | 12/2003 | Crawford, Jr. | |
| 2004/0021678 A1 | 2/2004 | Ullah | |
| 2004/0117359 A1 | 6/2004 | Snodgrass | |
| 2004/0225631 A1 | 11/2004 | Elnaffar | |

(Continued)

OTHER PUBLICATIONS

Beyer et al., "Protecting the Quality of Service of Existing Information Systems", Computer Sciences Department, University of Wisconsin, 2003, pp. 1-10.

(Continued)

*Primary Examiner* — Jennifer To
(74) *Attorney, Agent, or Firm* — Trop, Pruner & Hu P.C.

(57) ABSTRACT

A database system includes an optimizer to generate resource estimates regarding execution of a request in the database system, and a regulator to monitor progress of execution of the request (and in some examples every step of the request), and to adjust the resource estimates based on the monitored progress. The regulator also adjusts a priority setting of the request according to the adjusted resource estimates.

14 Claims, 4 Drawing Sheets

(56) References Cited

U.S. PATENT DOCUMENTS

| | | | |
|---|---|---|---|
| 2004/0236757 A1 | 11/2004 | Caccavale | |
| 2004/0243692 A1 | 12/2004 | Arnold | |
| 2005/0010558 A1 | 1/2005 | Dettinger | |
| 2005/0038789 A1 | 2/2005 | Chidambaran | |
| 2005/0038833 A1 | 2/2005 | Colrain | |
| 2005/0039183 A1 | 2/2005 | Romero | |
| 2005/0066326 A1 | 3/2005 | Herbeck | |
| 2005/0071307 A1* | 3/2005 | Snyder | 707/1 |
| 2005/0081210 A1* | 4/2005 | Day et al. | 718/104 |
| 2005/0125213 A1 | 6/2005 | Chen | |
| 2005/0192937 A1 | 9/2005 | Barsness | |
| 2005/0262183 A1 | 11/2005 | Colrain | |
| 2005/0278381 A1* | 12/2005 | Diao et al. | 707/200 |
| 2006/0026179 A1 | 2/2006 | Brown | |
| 2006/0149695 A1* | 7/2006 | Bossman et al. | 706/48 |
| 2007/0100793 A1 | 5/2007 | Brown | |
| 2007/0162426 A1 | 7/2007 | Brown | |
| 2008/0052720 A1 | 2/2008 | Barsness | |
| 2008/0071759 A1 | 3/2008 | Santosuosso | |
| 2008/0133447 A1 | 6/2008 | Barsness | |
| 2008/0133454 A1* | 6/2008 | Markl et al. | 707/2 |
| 2008/0162417 A1 | 7/2008 | Morris | |
| 2008/0162418 A1 | 7/2008 | Morris | |
| 2008/0162419 A1 | 7/2008 | Brown | |
| 2008/0162583 A1 | 7/2008 | Brown | |
| 2008/0172419 A1* | 7/2008 | Richards et al. | 707/200 |
| 2010/0281285 A1* | 11/2010 | Blanding | 713/324 |

OTHER PUBLICATIONS

Nikolaou et al., "Transaction Routing for Distributed OLTP Systems: Survey and Recent Results", Department of Computer Science, University of Crete and Institute of Computer Science, 2002, pp. 1-26.

Sinnwell et al., "Managing Distributed Memory to Meet Multiclass Workload Response Time Goals", Department of Computer Science, University of the Saarland, 2002, pp. 1-8.

Oracle, "Oracle9i Database Resoruce Manager", Technical Whitepaper, 2001, pp. 1-11.

Finkelstein, Computer Science Department, Stanford University, "Common Expression Analysis in Database Applications," 1982, pp. 235-245.

Sellis, University of California, Berkeley, "Multiple-Query Optimization," ACM Transactions on Database Systems, vol. 13, No. 1, Mar. 1988, pp. 23-52.

Brown et al., U.S. Appl. No. 12/317,836 entitled "Database System Having a Service Level Goal Responsive Regulator" filed Dec. 30, 2008 (24 pages).

Brown et al., U.S. Appl. No. 12/317,985 entitled "Database System Having Regulator That Performs Workload Regulation Based on Optimizer Estimates" filed Dec. 30, 2008 (26 pages).

Brown et al., U.S. Appl. No. 12/482,780 entitled "Database System Having a Regulator to Provide Feedback Statistics to an Optimizer" filed Jun. 11, 2009 (33 pages).

Burger et al., U.S. Appl. No. 12/908,052 entitled "Generating an Integrated Execution Plan for Multiple Database Requests" filed Oct. 20, 2010 (34 pages).

Richards et al., U.S. Appl. No. 12/942,480 entitled "Managing Execution of Requests Using Information Relating to a Job" filed Nov. 9, 2010 (42 pages).

Douglas P. Brown et al., U.S. Appl. No. 12/952,561 entitled Rejecting a Request in a Database System filed Nov. 23, 2010 (37 pages).

Liu et al., Scheduling Algorithms for Multiprogramming in a Hard-Real-Time Environment, J. ACM 20, 1 (Jan. 1973), pp. 46-61.

U.S. Appl. No. 12/317,985, Non-Final Rejection dated Aug. 31, 2011, pp. 1-13 and attachments.

U.S. Appl. No. 12/317,985, Final Rejection dated Jan. 5, 2012, pp. 1-12 and attachments.

U.S. Appl. No. 12/317,985, Notice of Allowance dated Aug. 13, 2012, pp. 1-9.

* cited by examiner

ADJUSTING A RESOURCE ESTIMATE IN RESPONSE TO PROGRESS OF EXECUTION OF A REQUEST

BACKGROUND

A database is a collection of logically related data arranged in a predetermined format, such as in tables that contain rows and columns. To access the content of a table in the database, queries according to a standard database query language (such as the Structured Query Language or SQL) are submitted to the database. A query can also be issued to insert new entries into a table of a database (such as to insert a row into the table), modify the content of the table, or to delete entries from the table. Examples of SQL statements include INSERT, SELECT, UPDATE, and DELETE.

As database systems have increased in size and complexity, it has become more challenging to efficiently implement operational and management tasks in the database systems.

SUMMARY

In general, according to some embodiments, a database system includes an optimizer to generate resource estimates regarding execution of a request in the database system, and a regulator to monitor progress of execution of the request, and to adjust the resource estimates based on the monitored progress. The regulator also adjusts a priority setting of the request according to the adjusted resource estimates.

Other or alternative features will become apparent from the following description, from the drawings, and from the claims.

BRIEF DESCRIPTION OF THE DRAWINGS

Some embodiments are described with respect to the following figures.

DETAILED DESCRIPTION

Figure 1:
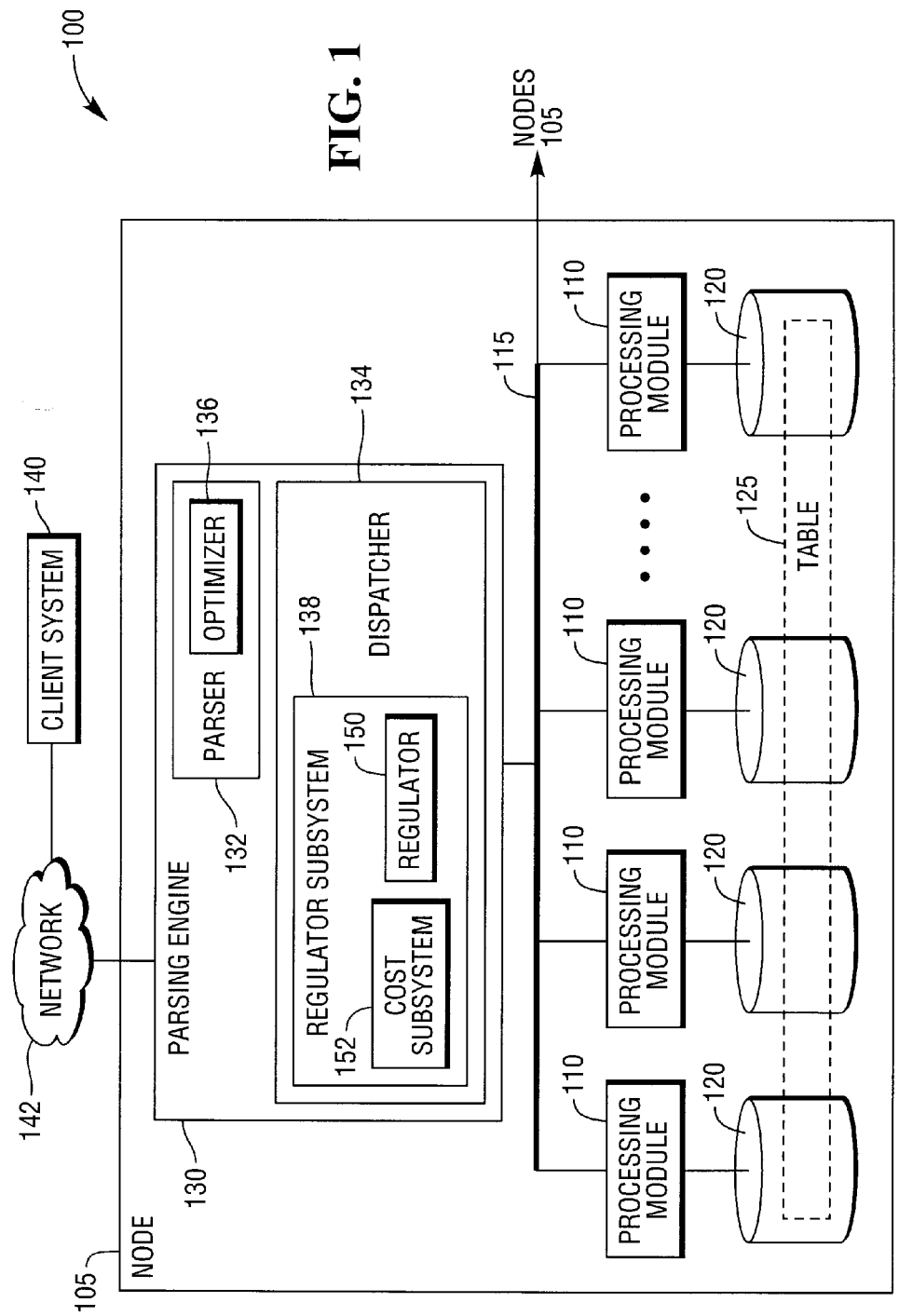
FIG. 1 is a block diagram of an example database system including a regulator subsystem in accordance with some embodiments.

In accordance with some embodiments, a database management system (or more simply, "database system") includes an optimizer that is able to provide resource estimates (also referred to as costs), and a regulator subsystem that receives the resource estimates from the optimizer and dynamically adjusts priority settings of requests executing in the database system. The request priority settings are adjusted according to the resource estimates and service level goals (SLGs) associated with the requests. Adjusting request priority settings (or priority levels) modifies the way shared resources are allocated among the requests, where the shared resources can include one or more of the following: CPU (central processing unit), disk-based storage (e.g., magnetic or optical disk storage), memory, queue, cache, and network resources.

The term "request" or "database request" refers to a database query (e.g., Structured Query Language or SQL query) that is processed by the database system to produce an output result. Alternatively, a "request" or "database request" can refer to a utility, such as a load utility to perform loading of data from a source to a target. More generally, a "request" or "database request" refers to any command or group of commands that can be submitted to the database system for performing predefined data access (read or write) tasks, or to perform creation or modifications of database structures such as tables, views, etc. A request can belong to one of multiple possible workloads in the database system.

A "workload" (or alternatively "workload group") is a set of requests that have common characteristics, such as an application that issued the requests, a source of the requests, type of query, priority, response time goals, throughput, and so forth. A workload group is defined by a workload definition, which defines characteristics of the workload group as well as various rules associated with the workload group. A "multi-class workload" is an environment with more than one workload.

The workload groups may be divided into workload groups of different priorities. A low priority workload group may include low priority requests such as background load requests or reporting requests. Another type of workload group includes requests that have short durations but high priorities. Yet another type of workload group includes continuous or batch requests, which run for a relatively long time.

The resource estimates (costs) provided by the optimizer can be time estimates to provide an estimate of an expected amount of time for corresponding requests to complete. In addition, the resource estimates provided by the optimizer can be estimates of usage of other resources of the database system, including as examples, an estimate of usage of a processor resource, an estimate of usage of an input/output (I/O) resource, and/or an estimate of usage of a network resource. The estimate of usage of the processor resource can indicate the expected number of cycles of one or more CPUs that execution of a request is expected to consume. The estimate of usage of the I/O resource can indicate the expected number of I/O accesses (e.g., read or write accesses of disk storage, for example) that execution of the request is expected to invoke. An I/O resource can be a physical I/O resource (e.g., megabits per second for a physical storage device) or a logical I/O resource (e.g., logical blocks per second, where a logical block refers to some predefined amount of data used by a data access subsystem such as a file system and the like). The estimate of usage of the network resource can indicate an amount of network traffic (such as traffic between different computer nodes) that is expected in the execution of the request.

The optimizer can also provide cardinality estimates. A cardinality estimate refers to an estimate of a size (e.g., number of rows) of a base table or a result table (that contains results of a database operation). Another resource estimate that can be provided by the optimizer is a spool size estimate regarding an estimated size of a spool, which is an intermediate table to store intermediate results during database operations.

Resource estimates are generated by the optimizer prior to start of execution of a database request. Consequently, it is possible that the initial resource estimates provided the optimizer may not match actual resource usage during request execution. If the optimizer-generated resource estimates remain static, then the adjustment of priority settings assigned to respective requests during execution of the requests may not be optimal if the resource estimates are inaccurate. In accordance with some embodiments, enhanced costing techniques are provided to allow for dynamic recalculation of the resource estimates (costs) of the remaining steps of a request during execution of the request. The "remaining steps" of the request refer to those steps of the execution plan corresponding to the request that have yet to be executed.

The recalculated estimates can then be used for dynamic adjustment of priority settings assigned to the request. Using adjusted resource estimates rather than static resource estimates initially provided by the optimizer in adjusting priority settings allows for improved performance in the control of execution of requests in a database system. Dynamic recalibration of resource estimates is performed for a request based on the regulator subsystem determining whether or not execution of the request is meeting a respective SLG (according to feedback regarding execution of the request).

An "SLG" or "service level goal" refers to a predefined set of one or more performance criteria that are to be satisfied during execution of a request. The SLG can be defined by a database administrator, for example. In some examples, an SLG can be any one or more of the following: a target response time; a target throughput; an enforcement policy (to specify that some percentage of queries are to finish in some predefined amount of time), and so forth. In a more specific example, the SLG for requests of a particular workload group can be "$\leq 1$ second @ 95," which means that each such request should execute within one second 95% of the time. Another example SLG can be "1,000 queries per hour."

An SLG can be defined for a request individually. Alternatively, an SLG can be defined for a workload group that has a number of requests.

Note also that resource estimates can be recalibrated in response to determining that cardinality estimates provided by the optimizer are inaccurate. As noted above, the optimizer can provide estimates of the size of a base table or a result table, or an estimate of a spool size. Inaccuracies in cardinalities can affect the estimated resource usage, including processor resource usage, (physical or logical) I/O resource usage, and/or network resource usage.

FIG. 1 illustrates an example database system 100 in which some embodiments of the invention can be incorporated. The database system 100 can include multiple computer nodes 105 (just one node depicted in FIG. 1). Each node 105 includes one or more processing modules 110 connected to a network 115. The processing modules 100 manage the storage and retrieval of data in respective data storage facilities 120. Each of the processing modules 110 may be one or more physical processors or may be a virtual processor, with one or more virtual processors running on one or more physical processors.

Each processing module 110 manages a portion of a database that is stored in a corresponding one of the data storage facilities 120. Each data storage facility 120 includes one or more disk drives or other types of storage devices. The nodes 105 of the database system are interconnected by the network 115.

As depicted in FIG. 1, a table 125 is distributed across the data storage facilities 120, where different rows of the table 125 can be distributed across the data storage facilities. In response to a request, one or more of the processing modules 110 can be instructed to retrieve corresponding rows from the table 125 to provide a result to the querying client (which can be one of the client systems 140).

The node 105 also includes a parsing engine 130, which has a parser 132 and a dispatcher 134. The parser 132 receives database requests (such as those submitted by client systems 140 over a network 142) or from another source, parses each received request, and generates executable steps for the parsed query. The parser 132 includes an optimizer 136 that generates query plans (also referred to as execution plans) in response to a request, selecting the most efficient from among the plural query plans. As noted above, the optimizer 136 can also produce resource estimates for the query plan.

The dispatcher 134 sends the executable steps of the query plan generated by the parser 132 to one or multiple processing modules 110 in the node 105. The processing modules 110 execute the steps. If the request specifies retrieval of data from the table 125, then the retrieved data is sent back by the database system 100 to the querying client system 140 for storage or display at the client system 140 (which can be a computer, personal digital assistant, etc.). Alternatively, the request can specify a modification of the table (adding data, changing data, and/or deleting data in the table).

The dispatcher 134 includes a regulator subsystem 138 according to some embodiments. Note that parts of the regulator subsystem 138 can also be in the processing modules 110 (not depicted), since the regulator subsystem 138 also monitors execution of requests, as discussed below. The regulator subsystem 138 has a regulator 150, which can be implemented with one or more software modules. The regulator subsystem 138 also includes a cost subsystem 152 according to some embodiments for recalibrating resource estimates.

In embodiments with multiple parsing engines 130, each parsing engine can have a corresponding parser and/or regulator subsystem.

Figure 2:
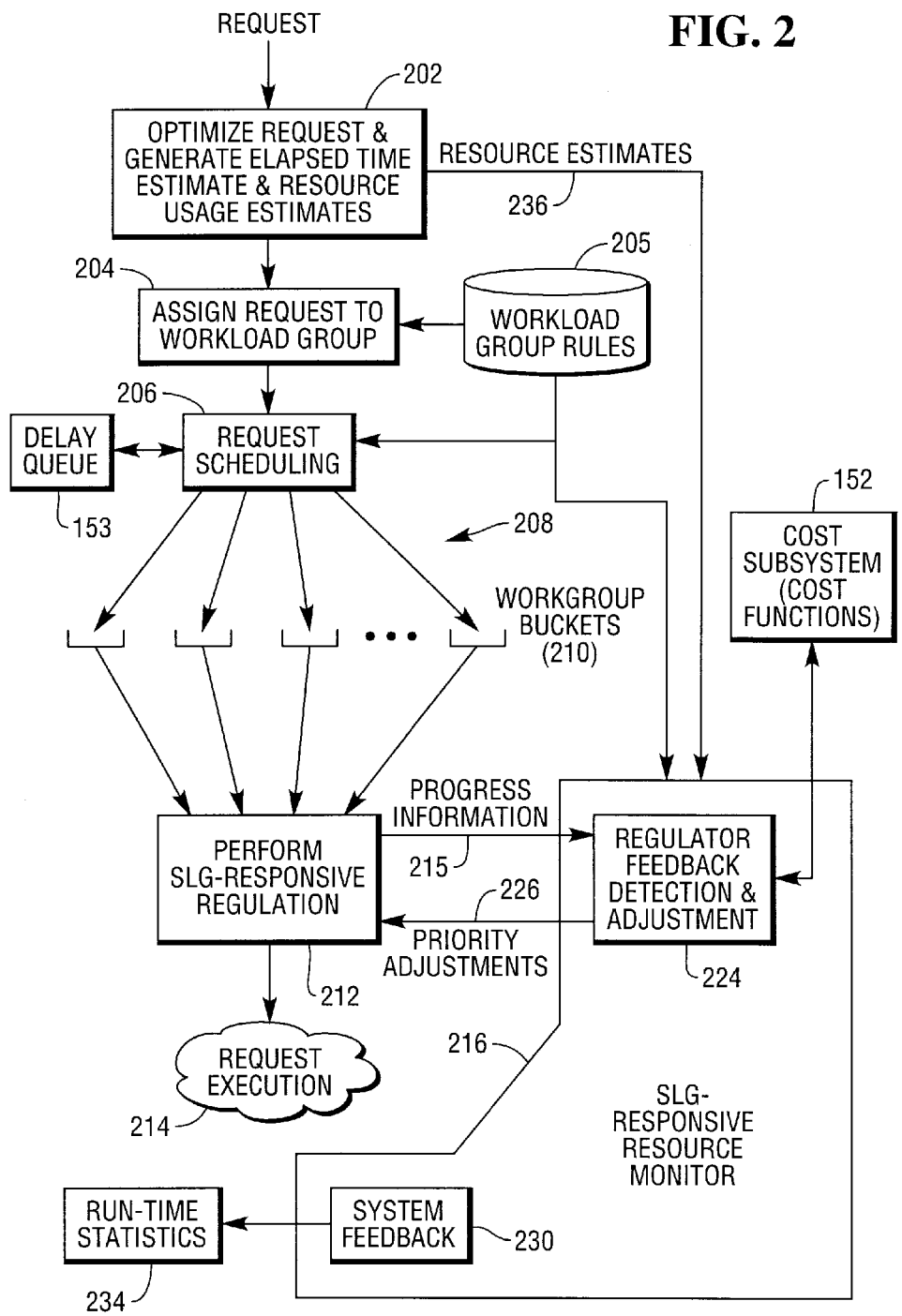
FIG. 2 illustrates an architecture for regulating workloads, in accordance with some embodiments.

Operation of the optimizer 136 and regulator subsystem 138 is illustrated in more detail in FIG. 2. In accordance with some implementations, the regulator subsystem is provided in a "closed-loop" workload management architecture to satisfy SLGs. The closed-loop workload management architecture is an automated goal-oriented workload management system capable of supporting complex workloads and capable of self-adjusting to various types of workloads. The database system's operation has several major phases: (1) assigning incoming requests to workload groups, and assigning goals (called service level goals or SLGs) to the workload groups; (2) monitoring the execution of the workload groups against their goals; and (3) regulating (adjusting and managing) the workload flow and priorities to achieve the service level goals.

An incoming request is optimized (at 202) by the optimizer 136. In generating query plans and selecting an optimal one of the query plans for submission to the processing modules 110 for execution, the optimizer 136 can generate an estimate of the response time (elapsed time) that provides an indication of how long the request should execute in the database system. Note that estimates can also be generated for every individual step of the request, and a sum of the estimates for the individual steps provides the estimate of the entire request. Moreover, in accordance with some embodiments, the optimizer 136 can generate other resource estimates, including estimates of processor usage, I/O usage, and network usage, for each step of the request.

The optimizer 136 can produce the estimates of processor usage, I/O usage, and network usage based on a cost model. For example, the optimizer 136 can retrieve information relating to the processor capacity, which can be expressed in terms of millions of instructions per second (MIPS). Also, the optimizer 136, as part of its normal optimization tasks, can estimate the cardinalities of tables and intermediate spool files that are involved in execution of the request. Based on the estimated cardinalities and the processor capacity, the optimizer 136 is able to estimate the processor usage that is expected for execution of the request. The processor usage estimate can be performed on a per-step basis for each step of the query plan. Note that different steps can access different tables or different parts of tables across different access modules in the system.

Similarly, the optimizer 136 can also retrieve information regarding memory size (size of high-speed memory that can be used to temporarily store data). Based on the memory size and the expected accesses of data in base tables and intermediate tables that will be involved in each step of a query plan, the optimizer 136 is able to estimate the expected I/O usage for each step. The I/O usage includes I/O accesses of disk storage (e.g., the number of block I/Os to read from or write to a table or index).

Moreover, the optimizer 136 is able to determine which data-storage facilities 120 store data involved in the execution of the request. For each step of the query plan, the optimizer 136 is able to estimate how much inter-processor module or inter-node traffic is expected—this will allow the optimizer 136 to estimate the network usage (usage of the network 115 of FIG. 1) is expected for each step.

Based on the resource estimates (response time estimate and/or processor usage, I/O usage, network usage, table cardinality and/or spool size estimates), and/or based on other classification criteria for a respective workload, the regulator subsystem 138 assigns (at 204) the request to one of the multiple workload groups that have been defined. The assignment is based on accessing workload group rules 205 (as defined by workload definitions) to match characteristics of the request as identified by the optimizer 136 with various workload definition rules. The workload group corresponding to the workload definition rules most closely matching the characteristics of the request is identified, where the incoming request is assigned to the identified workload group.

Next, the regulator 150 performs request scheduling (at 206), where the regulator 150 determines whether or not an incoming request is to be immediately scheduled for execution or whether the incoming request should be held for later execution. As part of the request scheduling performed at 206, the regulator 150 can also consider concurrency levels—the maximum number of concurrent executing requests from each workload group. The regulator 150 monitors the concurrency levels of the workload groups, and if the concurrency level of the corresponding workload group (that the incoming request is assigned to) is above a predefined threshold (which means that there are too many concurrent executing requests for this workload group), then the incoming request for that workload group waits in a delay queue 153 for later execution until the concurrency level for this workload group subsides below the defined threshold.

If an incoming request can be scheduled for immediate execution, the regulator 150 places (at 208) the incoming request into one of multiple workload group buckets 210 (as defined by corresponding workload definitions). The "buckets" 210 can be execution queues that contain requests scheduled for execution.

Next, the regulator 150 performs SLG-responsive regulation (at 212) at the request level. The regulator 150 selects a request from one of the buckets 210, in an order determined by priorities associated with the workload groups, and executes (214) the selected request.

In accordance with some embodiments, the SLG-responsive regulation task 212 performed by the regulator 150 includes recalibrating resource estimates, as well as adjusting priority settings for an individual request based on the recalibrated resource estimates in an attempt to meet the SLG associated with the request. Recalibration of resource estimates can be provided by cost functions of the cost subsystem 152.

As noted above, the regulator 150 according to some embodiments receives initial resource estimates from the optimizer 136 for each request. To allow for the adjustment of resource estimates (on a continual basis), the costs functions of the cost subsystem 152 can be invoked by the regulator 150 adjust resource estimates during execution of various steps of an execution plan corresponding to the request As depicted in FIG. 2, an SLG-responsive resource monitor 216 (which is also part of the regulator subsystem 138 of FIG. 1) interacts with the cost subsystem 152. More specifically, the SLG-responsive resource monitor 216 includes a regulator feedback detection and adjustment module 224 that interacts with the cost subsystem 152. As further depicted in FIG. 2, the SLG-responsive resource monitor 216 also includes a system feedback module 230 that provides run-time statistics 234 as feedback.

The regulator feedback detection and adjustment module 224 of the SLG-responsive resource monitor 216 performs feedback detection and dynamic resource adjustment. The module 224 receives progress information (215) from the SLG-response regulation task 212, where the progress information 215 is reported based on monitoring execution of the request.

The regulator feedback and detection adjustment module 224 and the cost subsystem 152 are able to consider, at each step of the query plan associated with the request, whether the progress information for execution of the request so far that is received from the SLG-responsive regulation task 212 is consistent with the current resource estimates provided for the respective steps of the query plan. The progress information 215 can indicate whether or not the current resource estimates are inadequate (actual usage exceeds estimated resource usage) or excessive (actual usage less than estimated resource usage). If recalibration of resource estimates is needed based on comparing the progress information 215 to the current resource estimates, selected ones of the cost functions of the cost subsystem 152 can be invoked to recalibrate respective resource estimates, such as a first cost function to recalibrate a time estimate, a second cost function to recalibrate a processor usage estimate, a third cost function to recalibrate an I/O usage estimate, and so forth. In some examples, at the end of each step in a query plan, the cost functions of the cost subsystem 152 can be invoked to adjust resource estimates for remaining steps of the query plan to reflect the actual budget (actual usage of resources) at run-time. In this way, any inaccuracies in resource estimates can be dynamically re-calibrated during execution of steps of the query plan.

The cost functions of the cost subsystem 152 can also be invoked to make adjustments to resource estimates based on detected cardinality inaccuracies (inaccuracies in estimated cardinalities of base tables, result tables, or spool sizes).

By automating the process of re-calibrating resource estimates, the regulator 150 is able to perform its tasks more accurately, since there would be no need for human (e.g., database administrator) intervention for correcting any inaccuracies in resource estimates. In this manner, the database management system would be able to manage any type of workload to meet the customer needs.

Based on the re-calibrated resource estimates, the regulator feedback detection and adjustment module 224 can provide priority level adjustments (226) to the SLG-responsive regulation task 212. In response to the priority level adjustments (226), the SLG-responsive regulation task 212 adjusts priority settings accordingly to adjust priority settings for the remaining steps of the query plan.

In a specific example, a resource estimate provided by the optimizer 136 can specify that at the end of step 2 of a query plan, 10 CPU cycles are expected to have been consumed by execution of the request. However, progress information from the SLG-responsive regulation task 212 can indicate that execution of the request has actually consumed 40 CPU cycles at the end of step 2. The regulator feedback and adjustment module 224 may use this as an indication that the currently assigned priority setting for the request will not be sufficient to satisfy the SLG for the request. As a result, the regulator feedback and adjustment module 224 can cooperate with the cost subsystem 152 to dynamically adjust resource estimates. In the foregoing example, the resource estimates are adjusted such that more resources are assigned to the request to increase the likelihood that execution of the request will be performed according to the target SLG.

Figure 3A:
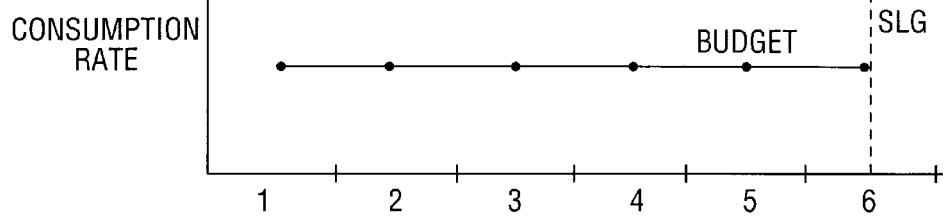
FIGS. 3A-3C are timing diagrams illustrating an example of adjusting resource estimates according to some embodiments.
Figure 3B:
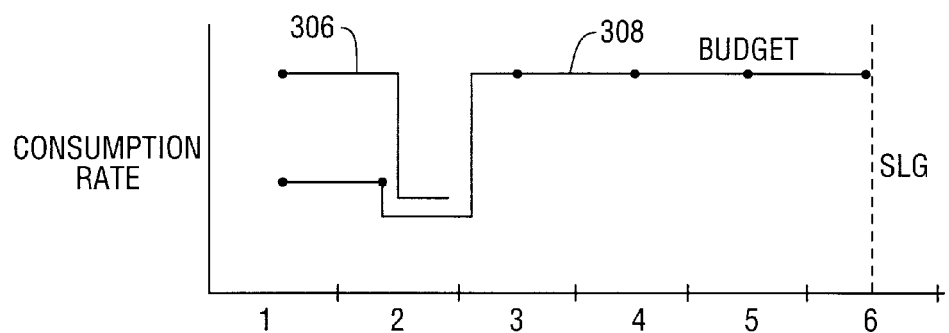
Figure 3C:
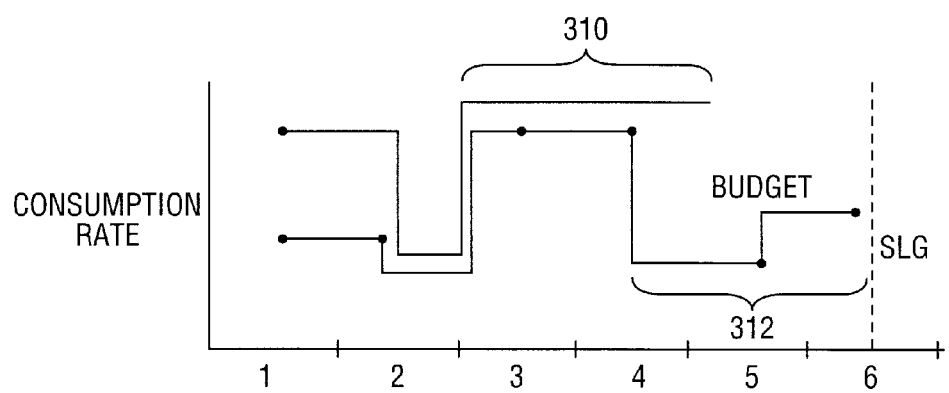

FIGS. 3A-3C depict an example of dynamic adjustment of a resource estimate based on monitored progress information. Each of FIGS. 3A-3C depicts a timing diagram that shows consumption rate of a resource (e.g., CPU resource usage) as a function of time intervals (1-6 in the example).

In the specific example shown, it is assumed that the target SLG for the request being executed is "Response Time≦180 Seconds," which means that to meet the SLG, the response provided for the request should be output in 180 seconds or less. Also, in the specific example, the optimizer 136 has produced a query plan with four steps that are estimated to consume 51.71 total CPU seconds. Thus, the consumption rate budget is about 0.29 CPU seconds per second (51.71 CPU seconds divided by 180 seconds)—in other words, the rate of consumption of CPU seconds allocated to execution of the request should be at least about 0.29 CPU seconds per second for the SLG to be satisfied. The budgeted CPU consumption rate (an example of a resource estimate) as initially estimated by the optimizer 136 is represented by budget 302 in FIG. 3A. Vertical dashed line 304 represents the maximum response time for the request that still satisfies the target SLG.

In the example, as further shown in FIG. 3B, the actual execution (represented by 306 in FIG. 3B) of the second step of the query plan consumed more CPU seconds than budgeted—as a result, the regulator 150 determines that the original resource estimate of 0.29 CPU seconds per second will not satisfy the SLG—in this case, the regulator 150 invokes the cost subsystem 152 to adjust the resource estimates (represented by budget 308) for the remaining steps of the query plan.

FIG. 3C shows that based on further monitored actual usage of CPU seconds in subsequent steps of the query plan (310 in FIG. 3C), the resource estimate (budget) is further adjusted (312 in FIG. 3C).

Figure 4:
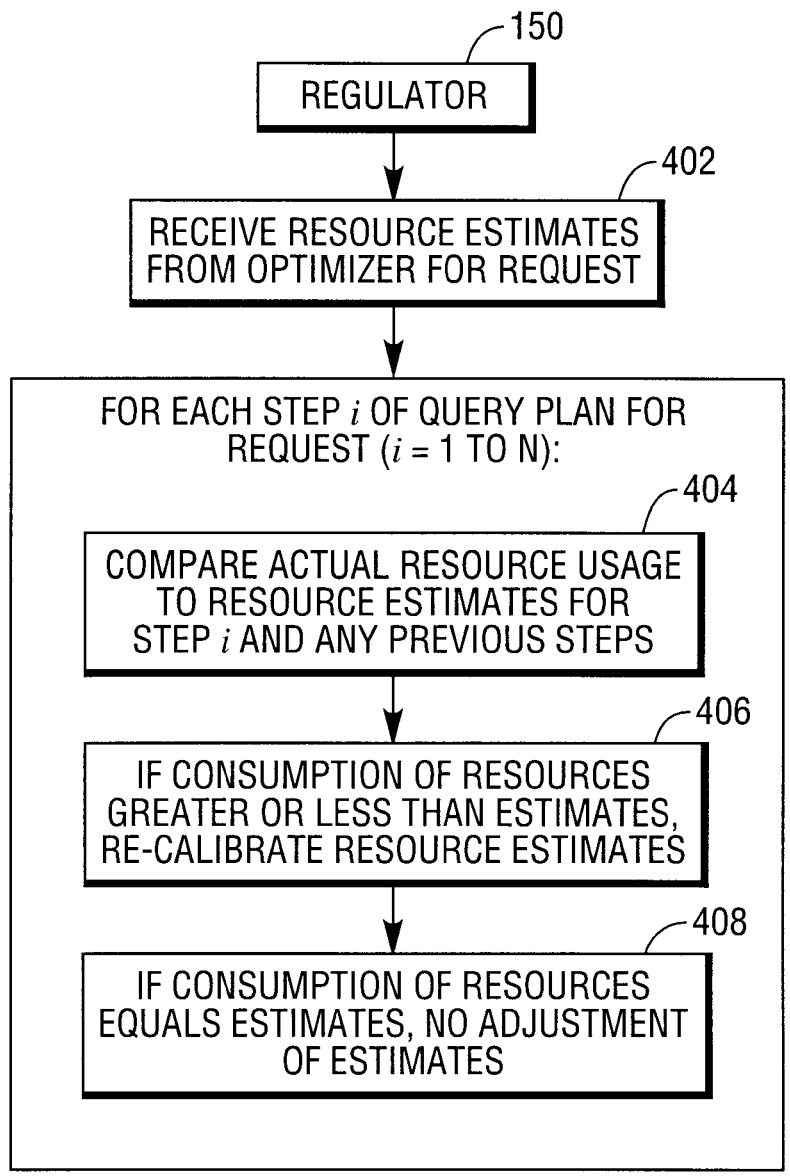
FIG. 4 is a flow diagram of a regulation procedure according to some embodiments.

FIG. 4 illustrates tasks performed by the regulator 150 in accordance with some implementations. The regulator 150 receives (at 402) resource budget estimates from the optimizer 136 for a particular request that is being executed by the database system. The resource estimates from the optimizer 136 includes resource budget estimates for each of multiple steps of a query plan produced by the optimizer for the request.

Then, for each step i of the query plan for the request, where i starts at 1 and increments to N (N representing the number of steps of the query plan), the regulator 150 compares (at 404) actual usage of resources (based on the progress information 215 shown in FIG. 2 associated with execution of the request) with current resource estimates for step i and any previous steps.

If the actual consumption of the resources is determined to be greater or less than (by some predefined threshold) resource consumption indicated by the current resource estimates up to step i, then the regulator 150 can re-calibrate (at 406) the resource estimates. On the other hand, if the actual consumption of resources is determined to be equal (or substantially equal to within some predefined range) resource consumption indicated by the current resource estimates up to step i, then the regulator 150 does not adjust the resource estimates (408).

Note that tasks 404, 406, and 408 are iteratively performed for multiple ones of the steps of the query plan (steps 1 to N).

The various components of the database system depicted in FIG. 1 or 2 can be implemented with machine-readable instructions that are loaded for execution on a processor. A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A database system comprising:
   at least one processor;
   an optimizer executable on the at least one processor to generate resource estimates regarding execution of a request in the database system; and
   a regulator executable on the at least one processor to:
   monitor progress of execution of the request to determine actual consumption of resources during the execution of the request;
   compare the actual consumption of the resources during the execution of the request with the resource estimates;
   adjust the resource estimates based on the comparing;
   adjust a priority setting of the request according to the adjusted resource estimates;
   receive cardinality estimates provided by the optimizer regarding a size of at least one table or a size of at least one spool for storing an intermediate result; and adjust the resource estimates based on determining that the cardinality estimates are inaccurate.

2. The database system of claim 1, wherein the resource estimates from the optimizer are selected from the group consisting of a time estimate, an estimate of usage of a processor resource, an estimate of usage of an input/output resource, and an estimate of usage of a network resource.

3. The database system of claim 2, wherein the estimate of usage of the processor resource comprises an estimate of usage of one or more central processing units (CPUs) provided in one or more computer nodes of the database system, wherein the estimate of usage of the input/output resource comprises an estimate of a number of accesses of a disk-based storage, and the estimate of usage of the network resource comprises an estimate of an amount of data to be communicated over a network between processing modules of the database system.

4. The database system of claim 1, wherein the regulator is executable to adjust the resource estimates by increasing the resource estimates in response to the comparing indicating that the actual consumption of the resources is greater than the resource estimates.

5. The database system of claim 1, wherein the regulator is executable to adjust the resource estimates by decreasing the resource estimates in response to the comparing indicating that the actual consumption of the resources is less than the resource estimates.

6. The database system of claim 1, wherein the optimizer is executable to:
provide a query plan for the request, wherein the query plan includes a plurality of steps; and
provide resource estimates for each of the plurality of steps of the query plan.

7. The database system of claim 6, wherein the regulator is executable to adjust the resource estimates in response to comparing the resource estimates for each of the plurality of steps with actual usage of the resources during execution of the request up to a corresponding one of the plurality of steps.

8. The database system of claim 1, wherein the regulator is executable to adjust the resource estimates at specified time intervals.

9. A method for use in a database system comprising:
receiving, from an optimizer, a resource estimate for a request;
comparing, by a regulator executing on at least one processor in the database system, actual consumption of a resource during execution of the request with the resource estimate;
in response to determining based on the comparing that the actual consumption of the resource is greater than or less than consumption indicated by the resource estimate, the regulator adjusting the resource estimate;
adjusting a priority setting of the request according to the adjusted resource estimate;
receiving cardinality estimates provided by the optimizer regarding a size of at least one table or a size of at least one spool for storing an intermediate result; and
adjusting the resource estimate based on determining that the cardinality estimates are inaccurate.

10. The method of claim 9, further comprising:
in response to determining based on the comparing that the actual consumption of the resource is equal or substantially equal to within a predefined range consumption indicated by the resource estimate, the regulator not adjusting the resource estimate.

11. The method of claim 9, further comprising:
generating, by the optimizer, a query plan for the request, wherein the query plan includes a plurality of steps;
determining whether actual consumption of the resource is greater than or less than consumption indicated by the resource estimate for a particular one of the plurality of steps,
wherein adjusting the resource estimate of the request is based on the determining.

12. The method of claim 9, further comprising:
generating, by the optimizer, a query plan for the request, wherein the query plan has a plurality of steps,
wherein the comparing, adjusting of resource estimate, and adjusting of priority setting are iteratively performed for multiple ones of the plurality of steps.

13. An article comprising at least one non-transitory machine-readable storage medium storing instructions that upon execution cause at least one processor in a database system to:
receive, from an optimizer, a resource estimate for a request;
compare, by a regulator, actual consumption of a resource during execution of the request with the resource estimate;
in response to determining based on the comparing that the actual consumption of the resource is greater than or less than consumption indicated by the resource estimate, adjust, by the regulator, the resource estimate;
adjust a priority setting of the request according to the adjusted resource estimate;
receive cardinality estimates provided by the optimizer regarding a size of at least one table or a size of at least one spool for storing an intermediate result; and
adjust the resource estimate based on determining that the cardinality estimates are inaccurate.

14. The article of claim 13, wherein the resource estimate from the optimizer is selected from the group consisting of a time estimate, an estimate of usage of a processor resource, an estimate of usage of a input/output resource, and an estimate of usage of a network resource.

* * * * *